No. 878,708.
PATENTED FEB. 11, 1908.
C. BERG.
HEATED STEERING WHEEL.
APPLICATION FILED MAR. 25, 1907.
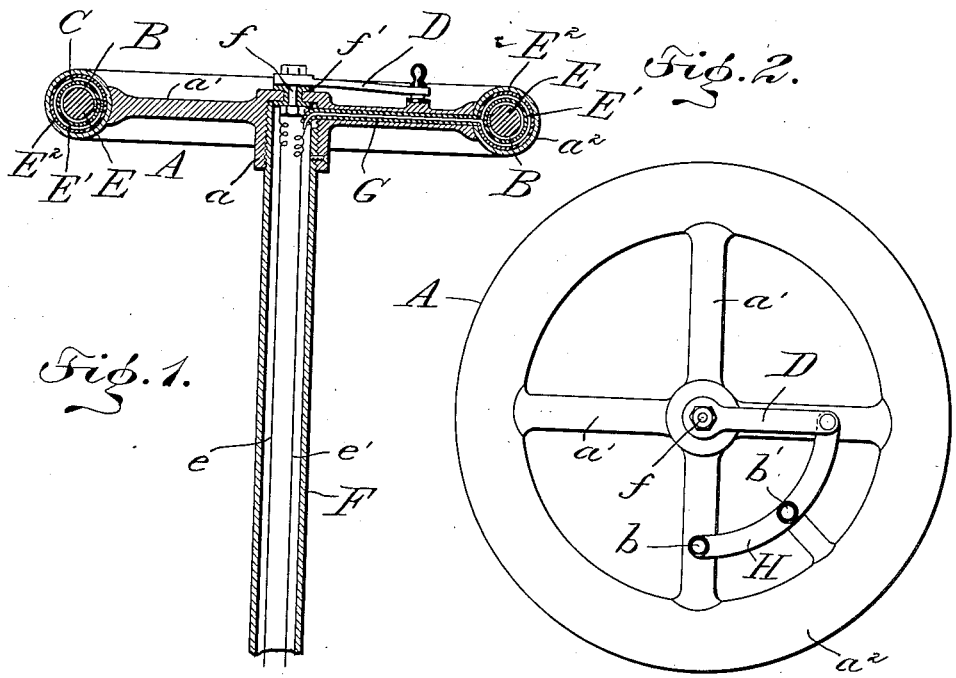
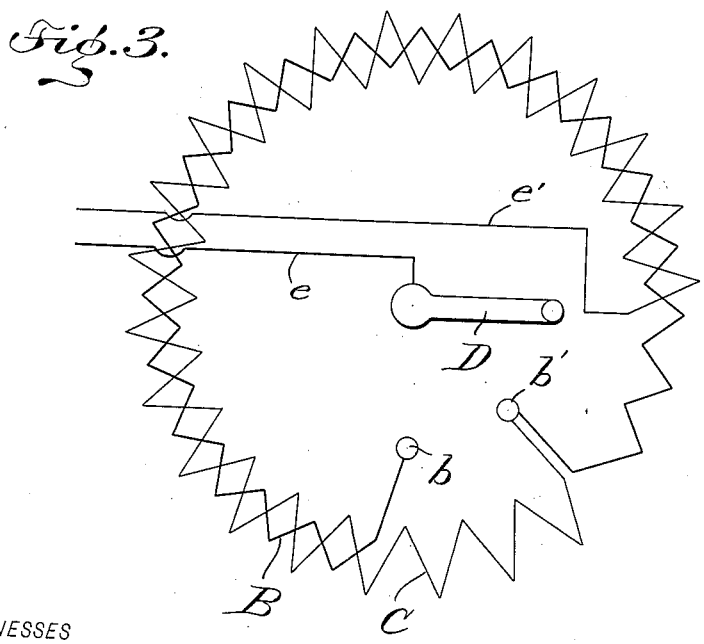
WITNESSES
A. C. Abbott
V. E. Nichols
INVENTOR
Charles Berg
BY Griffin Bernhard
ATTORNEYS

UNITED STATES PATENT OFFICE.

CHARLES BERG, OF NEW YORK, N. Y.

HEATED STEERING-WHEEL.

No. 878,708.   Specification of Letters Patent.   Patented Feb. 11, 1908.

Application filed March 25, 1907. Serial No. 364,338.

*To all whom it may concern:*

Be it known that I, CHARLES BERG, a citizen of the United States, residing at the city of New York, borough of Brooklyn, and State of New York, have invented certain new and useful Heated Steering-Wheels, of which the following is a specification.

This invention is a heated steering wheel, and, more particularly, one which is heated by electricity.

It has long been recognized that in cold weather the chilling of steering wheels, and more especially those of automobiles, is a great inconvenience and disadvantage to operators, and, furthermore, precludes them from exercising the same control over such machines during the winter months as is possible in warm weather.

This invention obviates the disadvantages referred to in that the heating power of electricity is availed of to keep the steering wheel at any desired temperature.

The device is simple, economical to manufacture, and efficient in operation, and at all times is subject to the control of the operator without trouble or inconvenience.

Various advantages of the invention will be apparent from the following detailed description thereof.

In the accompanying drawings, I have illustrated one practical embodiment of the invention, but the construction shown therein is to be understood as illustrative only, and not as defining the limits of the invention.

Figure 1 is a vertical section through a steering post, and the heated steering wheel contemplated by this invention. Fig. 2 is a plan view of the steering wheel. Fig. 3 is a diagram illustrating a plurality of electrical resistance coils adapted to be individually and severally supplied with current.

In one embodiment of my invention the steering wheel A consists of a hub $a$, a plurality of radial spokes $a'$ and a rim $a^2$. These parts may be made in any suitable or approved way, but it is preferred to employ a hollow rim $a^2$, the latter being circular in cross section.

The hollow rim of the steering gear is made, preferably, of metal, and it houses or incases an electrical heater. Various forms of means for electrically heating the steering wheel may be employed, but in the drawings I have shown an electrical heater consisting of a plurality of coils, one of which may be supplied with current for the purpose of heating the steering wheel to a low temperature, but provision is made for including said coils in series, for the purpose of heating the steering wheel to a higher temperature in very cold weather.

As shown in Fig. 3, the electrical heater consists of a low resistance coil B and a coil C of greater resistance than the coil B, said coils being concentric to each other and adapted to be housed or incased within the rim $a^2$ of the steering wheel. The coil B is connected at one end to a contact $b$, and said coils are connected, also, with a common contact $b'$. The feed wire $e$ is in electrical connection with the switch D, and the return wire $e'$ is connected with said coils B C. With the switch in the position shown in Fig. 3, no current passes through the coils. The switch is adapted to be shifted into engagement with contact $b$ for the purpose of including said coils in series in the circuit, whereby the current is caused to traverse both of the coils, and the maximum heating capacity is secured. The switch, however, may be shifted to the contact $b'$ for the purpose of including the coil C only in the circuit, thus reducing the capacity of the heater. It is evident that any desired number of electrical resistances may be employed according to the heating capacity of the system, and in such event, the switch and contacts must be arranged to include the resistances, either singly or in multiple, as may be desired.

The electrical heating appliance may be combined with the steering wheel in various forms, but in Fig. 1 of the drawings I have shown one practical construction of such heater. Within the hollow rim $a^2$ is arranged a core E of insulating material, and around this core is wrapped or coiled the electrical resistance B. The resistance is incased by a layer E' of insulating material, and on this layer is wrapped or coiled the electrical resistance C, the latter being in turn incased by another layer E$^2$ of insulating material. The insulating materials E' E$^2$ may be composed of any thin substance which will electrically insulate the coils B C from each other, and also electrically insulate the coil C from contact with the wall of the hollow rim $a^2$, but such electrical insulating material should permit the free transmission of heat from the coil or coils to the hollow rim. The conductors $e$ $e'$ are shown in Fig. 1 as extending through a hollow post F, the latter being attached to the hub $a$ of the steering wheel A. The conductor $e$ is secured to a bolt $f$ which extends through a bushing $f'$ of insulating material. This bushing serves to electrically insulate the conductor from the steering post and the steering wheel, and said bolt $f$ serves as the electrical connection between the conductor $e$ and the switch D, and also as the pivot for said switch D. The other conductor $e'$ is incased within a tube G of insulating material, which tube extends through one of the spokes $a'$, the latter being hollow for the reception of a part of the conductor $e'$ and its insulating tube G, whereby the conductor $e'$ may be electrically connected with the coils.

The switch contacts $b$ $b'$ are mounted on, and electrically insulated from, the plate H which is attached to adjacent spokes $a'$ of the steering wheel, but it will be understood that the switch contacts may be supported in any suitable way in the path of the switch D. Although I have shown the steering wheel as being carried by a hollow post, and the conductors $e$ $e'$ as extending through said hollow post, it will be understood that such construction and arrangement, as well as the detailed construction herein described, are not essential parts of this invention. A solid post may be substituted for the hollow post, the conductors $e$ $e'$ may be arranged externally of the steering post, and the detailed construction of the parts may be modified within wide limits, and without departing from the principle of this invention.

The operation will be readily understood by those skilled in the art. When it is desired to heat the steering wheel to a low temperature, as is frequently necessary in moderate weather, the operator turns the switch D to make the contact $b'$, thus sending the current through one of the electrical resistances C and heating the wheel to the desired temperature. In cold weather, however, it is necessary to raise the temperature of the steering wheel, and for this purpose the switch D is adjusted to make the contact $b$, thus sending the current into both heating coils which develop an increased volume of heat which is transmitted to the hollow wheel.

Having thus fully described the invention, what I claim as new, and desire to secure by Letters Patent is:

1. A steering wheel provided with a hollow rim, an insulating core therein, a heating coil on said core, another heating coil enveloping the first named coil, insulations for keeping the coils from contact with each other and with the wheel rim, and means whereby current may be supplied to both coils or one of said coils.

2. A hollow steering wheel provided with a hollow circular rim, and means interiorly of said rim for electrically heating the same.

3. A steering wheel provided with a hollow rim, means for electrically heating said rim, and means for controlling the current supplied to said electrical heating means.

4. A steering wheel, a plurality of concentric resistance coils coöperating therewith, and means for controlling the electric current individually and severally to said coils.

5. A steering wheel provided with a hollow rim, a core of insulating material therein, and a plurality of coils of different resistances confined between the wall of the rim and said core.

6. A steering wheel provided with a hollow substantially circular rim, a plurality of heating coils of varying resistances within said rim, and means for controlling a current individually and severally to said coils.

7. A steering wheel having a hollow rim, a plurality of heating coils of varying resistances housed within said rim, means for electrically insulating said coils from one another and from the hollow rim, and a switch for controlling an electric current to said coils.

8. A hollow post, a hollow steering wheel provided with a hollow hub which is attached to said post, electrically heated means incased within said wheel, and means for supplying a current thereto through said post and the wheel hub.

In testimony whereof I have signed my name to this specification in the presence of two subscribing witnesses.

CHARLES BERG.

Witnesses:
H. I. BERNHARD,
JAS. H. GRIFFIN.